UNITED STATES PATENT OFFICE.

GUSTAF ODERT PÉTER, OF OSKARSHAMN, SWEDEN.

METHOD OF MAKING DATE MARMALADE.

1,118,369.      Specification of Letters Patent.      Patented Nov. 24, 1914.

No Drawing.      Application filed October 29, 1913. Serial No. 798,123.

*To all whom it may concern:*

Be it known that I, GUSTAF ODERT PÉTER, a subject of the King of Sweden, and resident of Oskarshamn, Sweden, have invented a certain new and useful Improvement in Methods of Making Date Marmalade, of which the following is a specification.

The yogurt-milk, *i. e.* sour milk containing a ferment of *Bacillus Bulgaricus*, not having come into general use, owing chiefly to the troublesome and complicated mode of preparing it, a proposal has been made to introduce yogurt-culture in more or less concentrated solutions of sugar or fruit-juices. But sugar and fruit-juices are generally digested or dissolved during an early stage of the digestion of food and therefore a substance has been sought for, in connection with which the culture of bacilli can reach the very heart of those bacteria which cause arterial sclerosis. Such a substance has been found in the fruit of dates.

The present invention relates to a mode of producing a marmalade from dates containing a ferment of *Bacillus Bulgaricus*, the main constituent of this marmalade being the flesh or juice of dates. Another ingredient is agar-agar. If preferred, sugar, glycerin, other fruits and a coloring matter may be added.

This marmalade is made in the following manner: The dates are stoned and boiled in water for about two hours. After the boiling has been finished, an addition of agar-agar is made, this agar-agar having been previously melted in hot water and beaten, and then the pulp is stirred for some minutes. Sugar, glycerin, other ingredients and a coloring matter may be added, and the whole kept boiling, until it has reached the desired degree of concentration. After cooling to about 42° C., the yogurt ferment is added, and the pulp is stirred until the temperature has gone down to about 34° C.

This marmalade is turned into pots which are covered with parchment paper or any other suitable material and kept at a temperature preferably not exceeding 20° C., or the marmalade is formed into cubes, tablets, or the like.

Having now described my invention, what I claim as new and desire to secure by Letters Patent is:

1. Improved method of making marmalade from dates with an addition of yogurt culture, by boiling the dates with agar-agar into a pulp of the desired concentration and adding ferment of yogurt to the same after cooling, stirring the whole mass until it has cooled sufficiently, pouring into receptacles.

2. Improved method of making marmalade from dates with an addition of yogurt culture, boiling the dates with agar-agar, sugar and glycerin into a pulp of the desired concentration and adding ferment of yogurt to the same after cooling, stirring the whole mass until it has reached a temperature of 34 degrees C. and pouring the same into receptacles.

In witness whereof I have hereunto set my hand in the presence of two witnesses.

GUSTAF ODERT PÉTER.

Witnesses:
    CARL FRANE,
    S. CANSOIR.